April 18, 1939.    F. S. FLOETER    2,154,739
TOOL HOLDER FOR LATHES
Filed Oct. 2, 1937
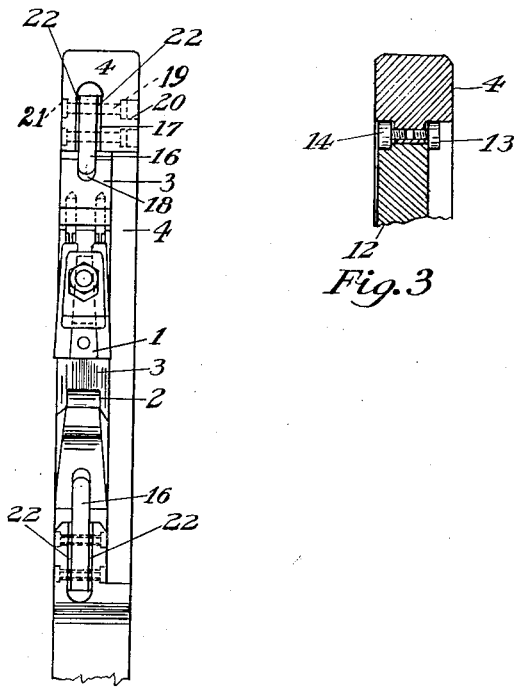
Fig. 4
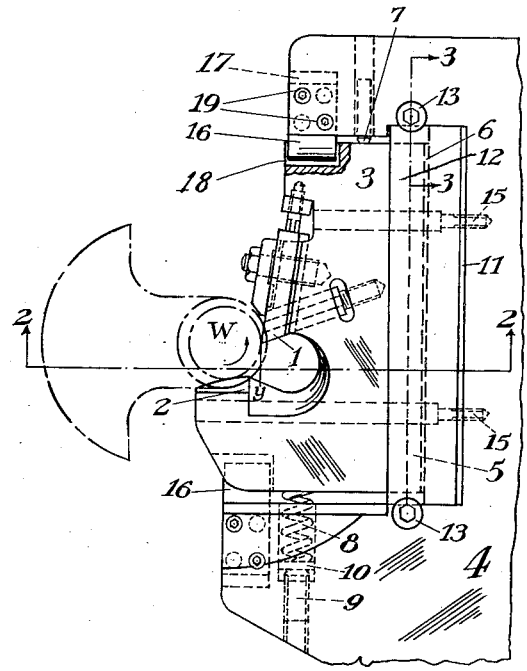
Fig. 3
Fig. 1
Fig. 2
FREDERICK S. FLOETER, Inventor
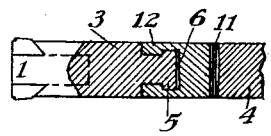
Attorney Patented Apr. 18, 1939

2,154,739

UNITED STATES PATENT OFFICE 2,154,739

TOOL HOLDER FOR LATHES

Frederick S. Floeter, Saginaw, Mich.

Application October 2, 1937, Serial No. 166,998

5 Claims. (Cl. 82—4)

This invention is an improvement in tool holders for lathes such as are used for turning the bearings of automobile engine crank-shafts and for similar work. The improvement pertains more particularly to that type of lathe tool holders in which a turning tool is mounted in operative relation to an opposing roller, or an abutment of the kind designated in the trade as a land, to prevent the work piece from being sprung out of shape by the thrust of the tool during the cut.

It is customary in structures of this character to mount the tool and the roller or land in a solid head, block, or tool holder, and this block is so mounted on the frame of the lathe as to be capable of a limited free oscillatory or floating movement that permits the cutting point of the tool to move along an imaginary line drawn tangent to the circle of the revolving work piece at the point of cut. Such floating movement of the tool has heretofore been made possible by mounting the tool block on a journal bearing parallel with the axis of the work piece and located at a point on the lathe frame sufficiently remote from the axis of the work to permit the tool to have the required amount of movement.

Difficulties have developed in practice from the use of such floating pivoted tool holders. One of these difficulties has arisen from the fact that the remote pivoted bearing has necessarily been a short bearing which will permit a slight, but very undesirable sidewise movement of the edge of the cutting tool after long use. In the turning of line bearings for high speed engines variations of even a few thousandths of an inch from perfect accuracy are not desirable; hence great importance must be attached to keeping the cutting edge of the tool perfectly parallel with the imaginary line which is the axis of rotation of the work piece. When a tool is employed whose width is equal to the length of the bearing to be turned, it has happened that the side edges of the tool, in cutting their way in between the two webs of a crank-shaft, were subjected to unequal sidewise thrust. Consequently, if there was only a slight sidewise movement of the tool holder as a result of such thrust, imperfect work would result.

The journal pin type of mounting for such a tool holder has been found lacking in that degree of stability which is required in the present day development of the internal combustion engine art.

It is an object of my invention, therefore, to overcome this and other difficulties inherent in earlier tool holder mountings, and to provide a stronger, more reliable, simpler, and less expensive tool holder construction.

My improvement, therefore, aims to eliminate the pivoted mounting for a floating tool holder, and to attain the improved results by mounting it on the frame of a lathe, not by means of a pivot which necessarily has restricted bearing area and consequently a tendency to permit slight sidewise movement or rocking of the tool away from true parallelism with the axis of the work piece, but, by means of a long guideway of ample bearing area that extends a considerable distance above and below the horizontal center line of the tool, to afford ample rigidity against any tendency of the tool to be sprung away from its true tangent cutting line on the surface of the work piece, yet permitting the necessary slight amount of movement of the cutting edge parallel to the axis of the rotating piece.

In connection with such a positively guided and slidably mounted tool holder I provide means for adjusting the tool and the tool holder with respect to the carriage in which the tool holder is mounted so that the cutting edge of the tool will travel into the work the precise amount required to reduce the work to size.

I also provide means for adjusting the tool holder sidewise, so that the cutting edge of the tool can be shifted slightly in a direction lengthwise of the work piece, in order that the tool shall locate the finished bearing surface in exactly the right place along the length of the shaft. The elements of this sidewise adjusting means are designed and arranged with the object of effecting the adjustment with the smallest number of operating parts, in the interest of simplicity of construction and operation.

In addition to my improved guideway construction for effecting the tangential floating movement of the tool holder as above described, and the sidewise adjusting device, I provide novel means for rigidly holding the front end of the tool holder in the carriage, being an adjustable locking and holding device located at the front or work-engaging end of the tool holder, and located as close as practicable to the cutting edge of the tool and to the work engaging surface of the roller or land. This device, while avoiding any interference with the desirable free floating movement of the tool holder, prevents the front end of the tool holder from having any undesirable sidewise or wabbling movement. This holding and locking feature at the part of a floating tool holder nearest the tool and the land is, so far as I am aware, distinctly novel and constitutes an important contribution toward the attainment of extreme accuracy in the production of work where such precision is essential, as for example, in the manufacture of high speed engine crank-shafts, cam-shafts, and the like.

Having stated in general the nature and objects of my invention and its advantages over earlier structures, I shall now explain its construction and details as embodied in a preferred form, selected for purposes of description, but not as a limitation to the scope of the appended claims.

In the drawing, Fig. 1 is a part sectional side view of a tool holder mounted in a typical carriage such as is commonly used in crank-shaft lathes of either the known orbital type, or the straight line bearing turning type, a work piece being shown in position for turning, Fig. 2 is a sectional view, on line 2—2 of Fig. 1, through the parts shown in Fig. 1, the work piece being omitted.

Fig. 3 is a fragmentary section on the line 3—3 of Fig. 1,

Fig. 4 is a front view of the parts shown in Fig. 1, the work piece being omitted.

In Fig. 1, W indicates the work piece, 1 designates the cutting tool, and 2 is a hardened steel land or support for the work piece to prevent its springing under the action of the tool. The arrangement of the work, tool, and land is a conventional one known in the art. Instead of the fixed land or abutment 2, a roller may be employed. The tool and the land or roller are both mounted in any usual or convenient way upon the tool holder block 3, the shape and form of which is clearly shown in Figs. 1, 2, and 3.

As is indicated in Fig. 1, the tool holder block is capable of a limited up and down movement, so that the cutting edge of tool 1 may have a slight vertical movement along an imaginary line Y tangent to the circle of the work piece at the point of cutting, as is usual in machines of this character.

Heretofore, tool holders have been mounted for such slight up and down movement by being connected pivotally to the carriage 4, and some of the disadvantages of that arrangement have been referred to in the foregoing opening statement.

In order to attain more accurate and reliable action of the tool and to provide for such continued reliability even after long use of the machine I have devised an improved mode of mounting of the tool holder block in the tool holder carriage 4, as is best shown in Figs. 1 and 2.

The rear vertical end of the tool holder block 3 is shaped to present a vertical guide 5 which is slidingly received in a way or channel 6 in the carriage 4 and is preferably long enough to extend from a point lower than the work to a point considerably above it. Thus the tool holder 3 can have the desired slight up and down movement, but on account of the length and the large amount of bearing surface afforded by the guide 5 the tool will be constrained to move exactly in the straight tangent line Y, and the large bearing area of the co-acting sliding surfaces 5, 6, will minimize wear and thus permanently maintain the desired accuracy of tool movement. Upward movement of the tool holder 3 is halted by a limit stop 7, adjustable in the carriage 4.

Tool holder 3 is normally urged against stop 7 by means of a spring 8, housed in a bore in the carriage 4. Tension of the spring can be adjusted by means of a screw 9 which is threaded in the carriage and takes against a washer 10 that supports the lower end of the spring 8.

Means is provided for adjusting the tool 1 along the length of the work piece W, that is to say, perpendicular to the plane of the view Fig. 1. This sidewise adjustment is slight, but it is important because the finished bearing surface, which of course is determined by the width of the tool 1, must be located exactly as required by the design of the work piece which is being turned. When the work, say, an engine shaft, is completed the bearings must of course be found precisely located with respect to the length of the shaft so that the distance between the centers of the bearings shall register accurately with the centers of the engine in which the shaft is to be used. Such sidewise adjustment of the tool and of the tool holder 3 is effected by a novel arrangement shown in Figs. 1, 3 and 4.

Numeral 11, Figs. 1 and 2, designates a laminated shim inserted between the main part 4 of the tool carriage and a removable section 12 of the carriage, which section has the way 6 for the vertical guide 5.

The shims 11 are of appropriate thickness to keep the cutting edge of the tool 1 in a position relatively to the axis of rotation of the work piece such that the tool will reduce the work precisely to the required size. When the carriage parts 4 and 12 are assembled as shown in Figs. 3 and 5 they comprise the complete mounting for the rear part of tool holder 3. The part 12 and tool holder 3 can be shifted sidewise with respect to the carriage 4 in order to bring about the above mentioned adjustment of the tool lengthwise of the work. In making the adjustment the main body of carriage 4 remains in position, but the member 12 and tool holder 3 can be moved sidewise, see Figs. 3 and 4, with respect to the part 4 of the carriage by means of screws 13. These screws are threaded into the part 4 but their heads project over and take against the sides of the member 12 in the manner shown in Fig. 3. By loosening screw 13 and tightening screw 14 the member 12 will be shifted to the right with respect to carriage 4, and vice versa. A laminated shim 11 of appropriate thickness is clamped between parts 4 and 12 by means of screw bolts 15, thereby making the parts 4 and 12 serve as a unitary piece. Thus the tool holder 3 and the tool 1 are accurately positioned lengthwise of the work piece while permitting their slight up and down movement lengthwise of the member 12 during the cutting operation.

I provide additional means for imparting adequate rigidity to the front end of the tool holders 3 so as to prevent any sidewise weaving of the tool while it is being subjected to cutting stresses that might otherwise tend to displace the tool sidewise.

This additional feature comprises guiding tongues 16 that connect the upper part of carriage 4 with the upper part of the tool holder block 3, and similar tongues 16 which perform the same function at the lower part of the holder 3.

A preferred arrangement of the members 16 and the manner in which they are mounted so as to keep the holder 3 from any sidewise movement while permitting its free up and down movement is shown in Figs. 1 and 4.

The upper end of tongue 16 is received in a slot 17 formed in frame member 4, and the lower end of the tongue is slidingly received in a slot 18 provided in the tool holder 3. The tongue may be rigidly secured in either of the members 3 or 4, being slidable in the other member so as to permit the up-and-down movement of the tool holder block 3. In the form here shown the tongue is rigid in the slot 17 of part 4 and is slidable in slot 18 of the tool holder 3.

The tongues 16 are capable of being adjustably shifted sidewise by bolts 19 that are threaded into the tongue 16, and are rotatable in nonthreaded holes 20 in the carriage. Another complementary pair of bolts 21 is also provided so that the operator, by adjusting the four bolts, can shift the tongue 16 a little to the right or to the left, corresponding to the above described sidewise adjustment of the tool holder 3. Thus, when the tool holder 3 is moved up and down along guide 5 and channel 6 by the engagement of the land 2 against the face of the work piece W, the block 3 will also slide up and down on the thus accurately positioned upper and lower guiding tongues 16. Hardened shims 22 of appropriate thickness are inserted in the slots 17 at the sides of tongues 16 to prevent any disalinement of the tongues.

By the means above described I have provided a tool mounting which permits the cutting tool to have adequate vertical floating movement during the cutting operation, yet the device is not likely to get out of order on account of wear of the parts; the cutting tool may be precisely adjusted to the desired location of the finished bearings lengthwise of the shaft, and the degree of rigidity of the parts when so adjusted is adequate to insure a high degree of cutting accuracy that can be maintained permanently without any likelihood of developing undesirable sidewise movement of the edge of the cutting tool after a long period of use of the lathe, as in the earlier machines already mentioned.

Of course it is to be understood that in accordance with usual practice the tool carriage 4 is to be mounted in the lathe frame so as to impart the necessary approach and retracting movements to the tool relatively to the work.

Such a slidable mounting of the tool carriage 4 has not been illustrated herein because that is merely a matter of design and common knowledge in the art of making lathes and the operation of the invention as claimed is independent of the specific mounting of the tool carriage, or of the work piece.

Having thus described my invention, what I claim and desire to secure by Letters Patent is:

1. A lathe for turning a rotating work piece, comprising, a tool holder block having a tool and an abutment member, a longitudinal guide member on said block, a tool holder carriage having a rectilinear channel in which said guide member is received to allow the block a limited movement lengthwise of the channel, and means operable between the block and carriage and adapted to shift the block into various positions of lateral adjustment relatively to the carriage lengthwise of the work piece while maintaining the parallelism of the work-engaging edge of said tool with the axis of the work piece, and means to fix the block in such adjusted positions.

2. In combination, a tool holder block having a tool and an abutment member, a longitudinal guide member adjacent the rear edge portion of said block, a tool holder carriage having in its forward edge portion an upright channel in which said guide member is received, allowing the block rectilinear sliding movements along the channel, a stop engaged by the block for halting such movement, and means operable between the block and the carriage at the rearward portion of the block to shift the block into various lateral positions relatively to the carriage, and means located at the forward portion of the block and adjacent the tool adapted to fix the forward portion of the block in such laterally adjusted positions.

3. In combination, a tool block having thereon a tool and a land, a tool holder carriage having a main section and a removable section fixed thereto, shims intermediate said sections, the rearward portion of the tool block being mounted on said removable section by a longitudinally slidable guide and way connection, and tongue members located adjacent the tool and the land and presenting guiding members connecting the tool block and the carriage, said tongues being arranged to permit sliding movement of the block along the said guide and way connection, and adjusting means adapted to effect movement of the removable section of the carriage sidewise relatively to the main section thereof, and means for effecting sidewise adjustment of each of said tongues.

4. In combination, a tool holding member, a carriage member, the rearward portion of the holding member being mounted on said carriage member by a longitudinally slidable guide and way connection, a laterally adjustable tongue located at the forward portion of the tool holding member adjacent the tool thereon, said tongue comprising a sliding connection between the tool holding member and the carriage, and means including set bolts and shims adapted to effect lateral adjustments of the tongue in one of said members relatively to the other.

5. A lathe for turning a rotating work piece, comprising in combination a carriage, a tool-carrying block mounted in the carriage for limited vertical sliding movement relatively to the carriage, means at the rearward part of the block for adjusting the block forwardly and rearwardly in the carriage so as to establish the cutting edge of the tool precisely with respect to the work piece, and means at the forward part of said block and adjacent the tool thereon adapted to engage the carriage so as to keep the cutting edge of the tool properly alined with the longitudinal axis of the work while permitting the said vertical movement of the block and the tool with respect to the carriage.

FREDERICK S. FLOETER.